Sept. 23, 1958   V. W. H. TOWNS ET AL   2,853,664
DIGITAL SERVOSYSTEM FOR POSITIONING AN ADJUSTABLE MEMBER
Filed June 13, 1956   3 Sheets-Sheet 2

Sept. 23, 1958   V. W. H. TOWNS ET AL   2,853,664
DIGITAL SERVOSYSTEM FOR POSITIONING AN ADJUSTABLE MEMBER
Filed June 13, 1956   3 Sheets-Sheet 3
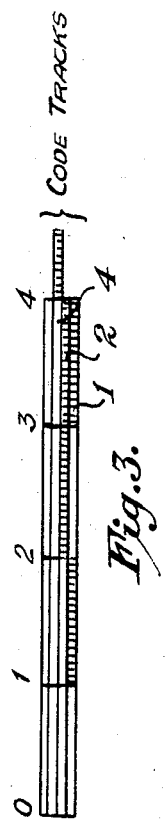
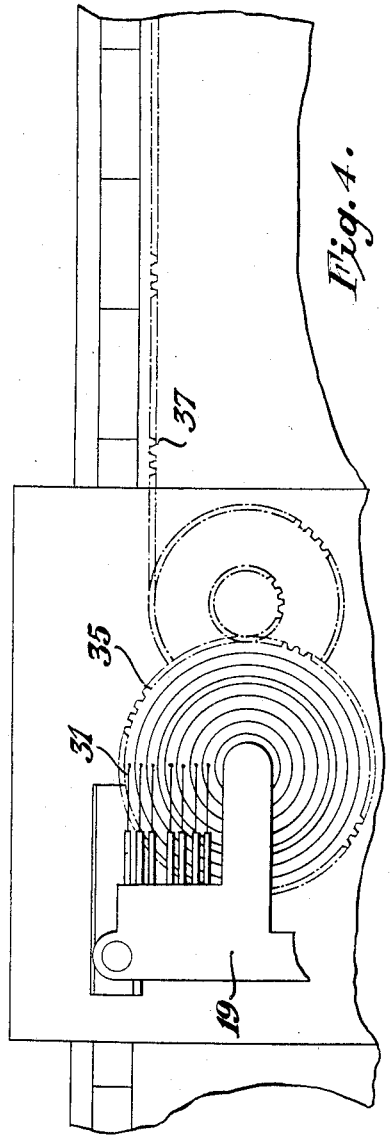

United States Patent Office 2,853,664
Patented Sept. 23, 1958

2,853,664

DIGITAL SERVOSYSTEM FOR POSITIONING AN ADJUSTABLE MEMBER

Victor William Henry Towns, Dulwich, London, David Silvester Evans, Bromley, and Patrick Ludlow Fleming Jones, Denmark Hill, London, England, assignors to Hilger & Watts Limited, London, England, a company of Great Britain Application June 13, 1956, Serial No. 591,200

Claims priority, application Great Britain June 13, 1955

7 Claims. (Cl. 318—28)

This invention is an apparatus for the automatic positioning of moving members.

The object of this invention is to provide means whereby a moving element, e. g., the cutting member of a machine tool, may be brought to a desired position by remote control to a high degree of accuracy.

Known means already exist, in which the moving element, during its travel, causes the emission of a series of electrical pulses, the number of which pulses is taken as a measure of the distance through which the member has moved. Such methods are liable to cause errors in the assessment of the distance owing to a number of factors, prominent among which are the possibility of missed counts or the fortuitous insertion of spurious counts.

Alternatively known means exist in which the moving element is driven and controlled in position by a leadscrew. This imposes functional requirements on the leadscrew which are in many cases incompatible by virtue of the fact that the driving function necessarily involves wear of the leadscrew which ultimately destroys the accuracy with which it can control the position of the moving element, particularly if this moving element is large and heavy, or is required to exert force on other bodies.

The method of the present invention avoids the possibilities of error inherent in both of these known means by making the position taken up by the moving element, which is positively driven, dependent only on its "reporting" its position relative to the lines of one or more scales each line of which is given a clear, distinct and unambiguous coding. Although, in the method to be described, two scales are involved, one of which exercises its function via the medium of a micrometer screw, which is itself a form of leadscrew, this particular screw moves only a light measuring member which exerts no force on other bodies and is thus favourably conditioned for retaining its accuracy, the member to be positioned, being driven to its desired position by a driver, e. g., an electric motor.

Moreover this screw is quite small, short in length and of a type already in large scale production, all of which factors allow its cost to be less than that of an accurate and robust leadscrew of considerable length.

An embodiment of the invention is illustrated in the accompanying drawings in which:

Figures 2 and 3 show the arrangement of the coded marks on the coded scales associated with the main scale and the detector slide respectively; and Figure 4 shows an alternative arrangement of the detector slide and the coded scale associated with the main scale.

Figure 1:
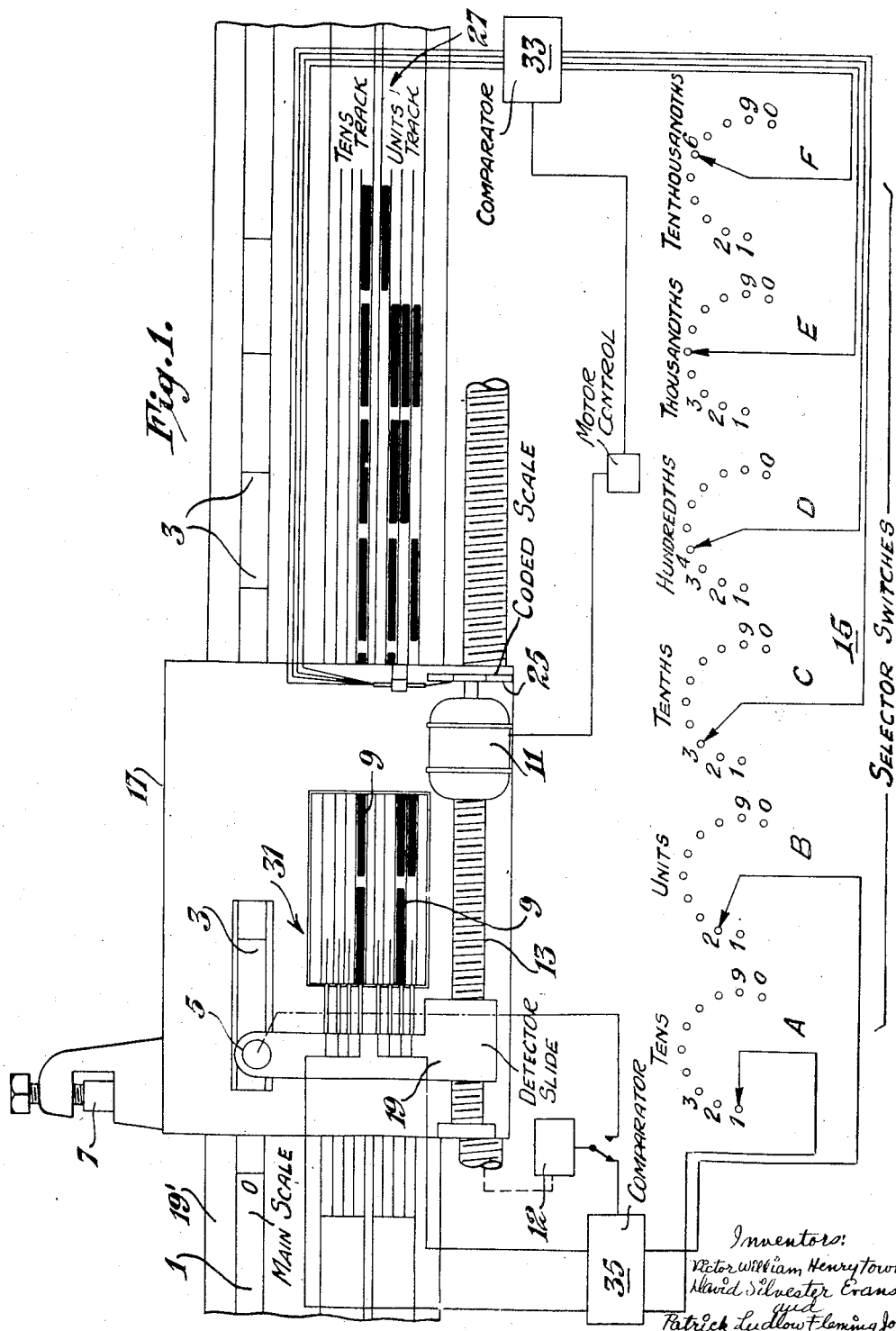
Figure 1 is a schematic diagram showing one embodiment of the apparatus.

Referring to the drawings, the following elements are provided:

(1) A main scale 1 of a length equal to or greater than the amount of motion required, and suitably divided with accurate graduations of any desired spacing in any system of measurement, e. g., feet and inches, or according to the metric system, but of a separation at least sufficient for each line 3 to be recognisably determined by a detector 5 which as described later may be (2) A photo-electric detector attached to the moving element 7 for stopping said element when the detector is exactly over a desired graduation line of this main scale. This detector may have the form described in United Kingdom patent specification No. 685,288.

(3) Means for selecting the desired main scale graduation line by provision of coded marks 9, which may be, magnetic, mechanical or electrical or a combination of these, for producing signals.

(4) Means 11 for moving the detector relative to the moving element by an accurately known amount, as by an electrically controlled micrometer screw 13, the range of this movement being equal to at least one graduation of the main scale.

(5) Means, e. g. selector switches 15, for feeding in information representing the position, in terms of scale divisions, at which the moving element 7 is to come to rest, by the setting of control switches by hand or by a pre-arranged programme, e. g., a punched card.

The method by which these elements effect the object of the invention will be described, for simplicity, as applied to a machine having a moving element 7 consisting of a cutting tool carried upon a carriage 17 capable of movement in either sense of one dimension along a bed 19.

It will be assumed that all settings are to be made in inches and decimal fractions of an inch. Attached to the bed is the main scale 1, with its length parallel to the direction of motion of the carriage 17, and having graduation lines at one inch intervals with zero inches 0 at the left-hand end. The detector 5 is attached to a slide 19', movable relatively to this carriage 17, the direction of motion of this slide being parallel to the direction of motion of the carriage.

The slide, as already stated is moved by means of a micrometer screw 13 capable of being set by an electric motor 11.

Figure 2:
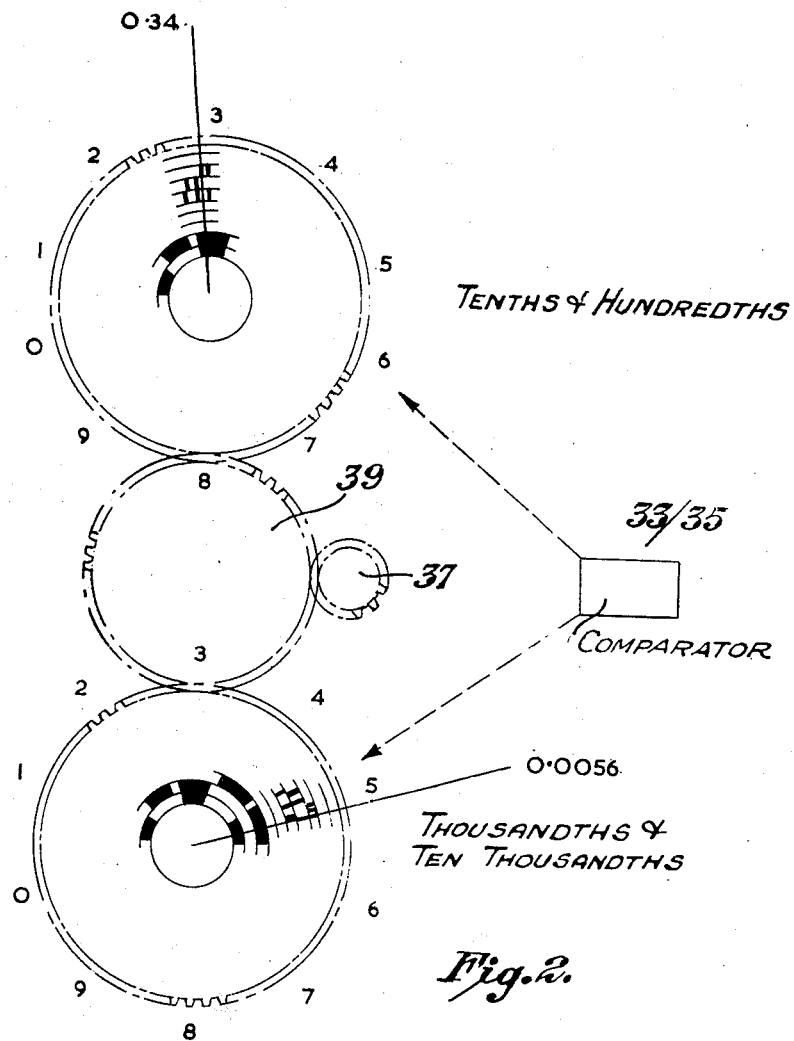

Associated with this micrometer screw is a coded scale 25, which may be in the form of a disc, or discs, Fig. 2, so constructed as to yield an unambiguous electrical signal indicating the angular position of this screw, and hence of the position of the slide 19' relative to the carriage 17. Each disc may be divided into a number of concentric rings, each ring having alternate conductive and non-conductive sections. Each ring is provided with markings coded, for example, in a binary system which permits measurement of the angular position of the micrometer screw to which it is coupled. Each disc may be engraved with any desired number of rings, each of which may be divided into any desired number of divisions, each division representing a specific lineal travel of the micrometer screw and hence of the slide to which the micrometer is rigidly affixed. The conductive and non-conductive sections may, as stated, be coded in a binary system and so arranged that each division is characterised by a unique combination of conductive and nonconductive sections in a radial direction. Associated with each ring are sensing means, e. g., a brush, the arrangement being such that whenever a brush contacts a conductive section, the output potential corresponds to a binary digit 1 and whenever a brush contacts a nonconductive section, the output potential corresponds to a binary digit 0.

It will be appreciated that the rings, instead of being formed of alternate conductive and insulating sections, may be formed of magnetic material with alternate sections carrying a flux pattern corresponding to the binary digits 1 or 0, in which case, of course, the sensing means would comprise, for example, magnetic pickup heads. Alternatively, each disc may be made of glass or the like marked out into a number of concentric rings, each ring having alternate transparent and opaque sections, in which case with the disc illuminated from one side, photoelectric sensing means placed on the other side of the disc would then produce an output potential corresponding to a binary digit 1 or 0, depending on whether the section being scanned was opaque or transparent.

The main scale 1 on the bed 19 has associated with it in parallel and fixed relationship a track 27 on which are placed a series of marks 9, each of which is associated with one of the main scale graduation lines 3.

These marks are similar to those on coded scale 25, and are in the form of a coded pattern Figs. 1 and 3, capable of being read electrically by a group of contact brushes 31, or other sensing device depending upon the nature of the marks, mounted on the slide 19' carrying the photo-electric detector 5 so as to indicate the numerical value of the main scale graduation line with which it is associated and in the region of which the photoelectric detector is positioned at any moment.

This region embraces a distance each side of the indicated line, equal to not more than, preferably less than, half the separation of the main scale graduation lines.

Describing now the sequence of operation involved in causing the moving member 7, e. g., the point of a cutting tool to reach a given position, it will be assumed that initially the slide 19' on the carriage 17 is in a position near the end of its travel at which the coded disc 25 attached to the micrometer screw 13 is giving an electrical signal representing zero inches.

It is also assumed that the carriage itself is so positioned that the photo-electric detector is immediately above the zero inch line 0 of the main scale 1 and that, in consequence, the contact brushes 31 carried by the detector slide are yielding a signal representing zero inches. The point of the tool 7 attached to the carriage is now in its zero, or datum, position.

Let it be assumed that the tool point is required to be traversed to a position 12.3456 inches to the right of this datum position. At the control unit are provided six selectors 15, e. g., rotary electrical switches A to F, each capable of being placed in one of ten positions, these positions being numbered 1 to 9 and 0 and adapted in each position to apply to comparator circuit 33 an electrical signal indicative of and unique to that position. Switch A is used to select the decimal digit desired in the "tens" position of the inch value required, switch B to select the digit in the units place, switch C to select the digit immediately following the decimal point (tenths) and so on, switch F selecting the digit in the fourth (tenthousandths) decimal place.

Switches C, D, E and F, set at positions 3, 4, 5, 6 respectively, co-operate to produce a coded electrical signal identical with that which would be produced by the coded disc 25 attached to the micrometer screw 13 of the slide 19 if this screw had been rotated sufficiently to move the slide a distance 0.3456 inch to the left relative to the carriage 17.

Switches A and B set at positions 1 and 2 respectively co-operate similarly to produce a coded electrical signal identical with that which would be produced by the contact brushes 31 attached to the slide 19' if the slide and detector 5 had been moved by the carriage into the region of the 12 inch main scale graduation.

The required dimension has now been set up and the next step is to operate a switch initiating the positioning operation.

Following this electrical comparator circuits 33 and 35 compare the signals from the C, D, E, F switch combination with that from the micrometer screw disc and finding that the switch 15 signal represents a number greater than that from the micrometer screw 13, cause the micrometer screw motor to operate until the signal from the associated micrometer screw disc is identical with that from the C, D, E, F switch combination. The slide carrying the detector has thus been moved a distance of 0.3456 inch to the left relative to the carriage, and comparator 33 produces an electric effect, lack of output, tending to stop the motor.

The electrical comparator circuits now compare the signals from the main scale sensing device 31 with the signal from the A, B switch combination. Since the signal from the said sensing device represent a smaller number than the signals from the A, B switch, the carriage drive motor 12 continues to operate automatically until the detector 5 is in the region of the 12 inch line of the main scale.

Control over the carriage drive motor is now passed automatically over to the detector which, when it reaches a position immediately over the 12 inch line of the main scale, causes the motor to stop. This handing over of control may also initiate a slowing down of the speed of the carriage drive motor. Since initially the detector was moved 0.3456 inch to the left of the zero inch line of the main scale and is now over the 12 inch line, the carriage, and hence the tool point, have been moved a distance 12.3456 inches to the right.

It is clear that means have to be provided whereby the direction of rotation of the micrometer screw and the main carriage drive motors depends on whether the control signals set up represent a greater or smaller number than that indicated by the coded scales associated with movements controlled by these motors. The comparator circuits, in addition to comparing the value of the signals determine their sense. It must be understood that the foregoing description outlines only one of many ways in which the features 1 to 5 can be combined and that many variations in detail can be envisaged.

Thus the main scale 1 may be attached to the travelling carriage, the detector 5, micrometer screw 13 and slide 19 being associated with the bed of the machine.

In particular as shown in Fig. 4, the marks 9 associated with each of the graduation lines 3 of the main scale need not of necessity be on a track 27 closely adjacent to the main scale. They may, for example, be disposed at suitable angular distances around a disc 35 carried by the detector slide 19', the disc being driven by a suitable coupling rack 37 parallel to and in correct fixed relationship with graduation lines on the main scale. The sensing device for reading these marks would, as before, be carried by the detector slide 19 and the spacing of the marks on this disc would be so arranged that, as the detector came into the region of a particular main scale graduation line, so the corresponding identifying mark on disc 35 would come into sensing relationship with the sensing device 31.

This is a preferred method, the method described being simpler of description.

Alternatively, each main scale graduation line 3 might have associated with it an electro-mechanically operated finger normally out of, but arranged to protrude into the path of a sensing element 31 carried by the detector slide 19'. Selection of a particular main scale line would then be performed by energising the appropriate electromagnet.

The photo-electric detector may comprise one or more Schwarz photo-conductive cells as described in our United Kingdom patent specification No. 685,288 or may be of a simpler form depending on the accuracy required the only requirement being that it shall emit a characteristic signal when accurately located relatively to the chosen line of the main scale.

Any or all of the coded scales referred to may be of the direct electrical contact type or may be of the type having light absorbing and transmitting, or light absorbing and reflecting, areas and may be read by photo-electric cells.

Although, in the above description, reference has been made to "a coded disc" for the micrometer screw, it may, and probably will be preferable to use more than one such see Fig. 3, where, as in the example given, the number of divisions is great, e. g., for four decimal places. In such a case, the several discs would be suitably coupled by gearing 37, 39 to the micrometer screw or to the driving motor, in such manner that a correct ratio of their angular movements to each other and to that of the micrometer screw, is obtained.

What is claimed is:

1. Apparatus for positioning a member movable in either sense of a single direction relatively to numbered major graduations of a scale, comprising a carriage carrying said member, switches for selecting and producing a first electrical effect indicative of a desired position for said movable member, driving means driving said movable member to said desired position, means associated with said carriage for producing a second electrical effect indicative of the instantaneous position of said movable member, comparator means for comparing said first and second electrical effects, for arresting movement of said movable member when said desired and instantaneous positions correspond, and a detector carried by said carrier cooperating with said graduated lines producing an electrical effect when said detector is immediately over a graduated line to stop movement of said movable member.

2. Apparatus for positioning a member movable in either sense of a single direction comprising first and second switching means controlling the extent of movement of said member, said first switching means controlling said extent of movement in terms of units of a scale of measurement, and providing a unit-part output, said second switching means controlling said extent of movement in terms of fractions of said units of said scale and providing a fraction-part output, a carrier carrying said movable member, driving means driving said carrier, a slider carried by and movable relatively to and in the direction of movement of said driving means driving said carrier, a graduated scale having graduation lines at distances spaced apart in units of said scale of measurements, a detector carried by said carrier cooperating with graduated scale providing an electrical output when said detector is accurately positioned to a graduated line, a coded marker track having coded markers defining the regions of said graduation lines, sensing means cooperating with said coded markers and providing a sensing output identifying said markers, slider driving means driving said slider, a coded scale driven by said slider driving means giving an output indicative of the extent of movement of said slider, a first comparator to which the last mentioned output and said decimal-part output are applied, motor control means controlled by the output of said first comparator providing a motor control output controlling the motor to add the fraction part of said unit of said scale to the movement of said carrier, a second comparator to which said sensing output and said unit part output are applied providing a carrier control output controlling said driving means driving said carrier, switching means switching said carrier control output from said carrier driving means and switching the detector output thereto, and switching the detector output therefrom when said detector has identified the graduation line in the region of a selected marker.

3. Apparatus for positioning a member movable in either sense of a single direction comprising a carriage carrying said member, a slider having limited movement relatively to and along the length of said carriage, a fixed graduated scale having graduation lines at unit distance apart, a detector carried by said slider, a marker track fixedly associated with said graduated scale, coded markers on said marker track each associated with a graduation line on said graduated scale and defining the region of said graduation line, first sensing members carried by said slider member, said first sensing members sensing the coding markers to produce an electrical output indicative of the position of said slider, selector switches for selecting a number indicative of a desired position to which the movable member is to be moved and for producing an electrical output indicative of said desired position, a first comparator connected to certain of said selector switches selecting the major significant digits of said number and to said first sensing means, a second comparator connected to others of said selector switches selecting the least significant digits of said number, driving means moving said slider in a sense opposite to the sense of movement of said carriage when moving to a desired position, a coded scale associated with said driving means, second sensing means cooperating with said coded scale to produce an electrical output indicative of the position of said coded scale, said second sensing means connected to said second comparator, said first comparator producing an electrical effect when the positions to which said certain of said selector switches are set correspond to the position to which said slider is moved, said second comparator producing an electrical effect when the positions to which said others of said selector switches are set correspond to the position to which said coded scale is moved, driving means for said carriage, said electrical effects arresting movement of said movable member, a detector carried by said carriage cooperating with said graduated lines producing an electrical effect when said digit is immediately over a graduated line to stop movement of said movable member.

4. Apparatus for positioning a member movable in either sense of a single direction comprising a carriage carrying said member, a slider having limited movement relatively to and along the length of said carriage, a fixed graduated scale having graduation lines at unit distance apart, a detector carried by said slider, a marker track fixedly associated with said graduated scale, markers on said marker track, each marker in the form of a coded pattern and each associated with a graduation line on said graduation scale and defining the region of said graduation line, first sensing members carried by said slider member, said first sensing members sensing the coding markers to produce an electrical output indicative of the position of said slider, selector switches for selecting a number indicative of a desired position to which the movable member is to be moved and for producing an electrical output indicative of said desired position, a first comparator connected to certain of said selector switches selecting the major significant digits of said number and to said first sensing means, a second comparator connected to others of said selector switches selecting the least significant digits of said number, driving means moving said slider in a sense opposite to the sense of movement of said carriage when moving to a desired position, a coded scale associated with said driving means, second sensing means cooperating with said coded scale to produce an electrical output indicative of the position of said coded scale, said second sensing means connected to said second comparator, said first comparator producing an electrical effect when the positions to which said certain of said selector switches are set corresponds to the position to which said slider is moved, said second comparator producing an electrical effect when the positions to which said others of said selector switches are set correspond to the position to which said coded scale is moved, driving means for said carriage, said electrical effects arresting movement of said movable member, a detector carried by said carriage cooperating with said graduated lines producing an electrical effect when said digit is immediately over a graduated line to stop movement of said movable member.

5. Apparatus for positioning a member movable in either sense of a single direction comprising a carriage carrying said member, a slider having limited movement relatively to and along the length of said carriage, a fixed graduated scale having graduation lines at unit distance apart, a detector carried by said slider, a marker track fixedly associated with said graduated scale, markers on said marker track, each marker in the form of a coded pattern and each associated with a graduation line on said graduation scale and defining a region less than half the distance between adjacent graduation lines on either side of said graduation line, first sensing members carried by said slider member, said first sensing members sensing the coding markers to produce an electrical output indicative of the position of said slider, selector switches for selecting a number indicative of a desired position to which the movable member is to be moved and for producing an electrical output indicative of said desired position, a first comparator connected to certain of said selector switches selecting the major significant digits of said number and to said first sensing means, a second comparator connected to others of said selector switches selecting the least significant digits of said number, driving means moving said slider in a sense opposite to the sense of movement of said carriage when moving to a desired position, a coded scale associated with said driving means, second sensing means cooperating with said coded scale to produce an electrical output indicative of the position of said coded scale, said second sensing means connected to said second comparator, said first comparator producing an electrical effect when the positions to which said certain of said selector switches are set correspond to the position to which said slider is moved, said second comparator producing an electrical effect when the positions to which said others of said selector switches are set correspond to the position to which said coded scale is moved, driving means for said carriage, said electrical effects arresting movement of said movable member, a detector carried by said carriage cooperating with said graduated lines producing an electrical effect when said digit is immediately over a graduated line to stop movement of said movable member.

6. Apparatus for positioning a member movable in either sense of a single direction comprising a carriage carrying said member, a slider having limited movement relatively to and along the length of said carriage, a fixed graduated scale having graduation lines at unit distance apart, a detector carried by said slider, a marker track fixedly associated with said graduated scale, coded markers on said marker track each associated with a graduation line on said graduated scale and defining the region of said graduation line, first sensing members carried by said slider member, said first sensing members sensing the coded markers, to produce an electrical output indicative of the position of said slider, selector switches, one for each digit of a number indicative of a desired position to which the movable member is to be moved for producing an electrical output indicative of said desired position, a first comparator connected to certain of said selector switches, each selecting one of the major significant digits of said number, and to said first sensing means, a second comparator, connected to others of said selector switches selecting the minor significant digits of said number, driving means moving said slider in a sense opposite to the sense of movement of said carriage when moving to a desired position, a coded scale associated with said driving means, second sensing means cooperating with said coded scale to produce an electrical output indicative of the position of said coded scale, said second sensing means connected to said second comparator, said first comparator producing an electrical effect, when the positions to which the selector switches for the major significant digits of said number are set correspond to the position to which said slider is moved, said second comparator producing an electrical effect when the positions to which said others of said switches are set correspond to the position to which said coded scale is moved, driving means for said carriage, said electrical effects arresting movement of said movable member, a detector carried by said carriage cooperating with said graduated lines producing an electrical effect when said detector is immediately over a graduated line to stop movement of said movable member.

7. Apparatus for positioning a member movable in either sense of a single direction comprising a carriage carrying said member, a slider having limited movement relatively to and along the length of said carriage, a fixed graduated scale having graduation lines at unit distance apart, a detector carried by said slider, a marker track fixedly associated with said graduated scale, coded markers on said marker track each associated with a graduation line on said graduated scale and defining the region of said graduation line, first sensing members carried by said slider member, said first sensing members sensing the coded markers to produce an electrical output indicative of the position of said slider, selector switches one for each digit of a number indicative of a desired position to which the movable member is to be moved, for producing an electrical output indicative of said desired position, a first comparator connected to certain of said selector switches, each selecting one of the whole-number part of said number, and to said first sensing means, a second comparator, connected to others of said selector switches, each selecting a digit of the decimal part of said number, driving means moving said slider in a sense opposite to the sense of movement of said carriage when moving to a desired position, a coded scale associated with said driving means, second sensing means cooperating with said code scale to produce an electrical output indicative of the position of said coded scale, said second sensing means connected to said second comparator, said first comparator producing an electrical effect when the position to which said selector switches for said whole-number part of said number corresponds to the coded pattern marker on said marker track to which said first sensing means are carried by said carriage when said slider is moved, said second comparator producing an electrical effect, when the position to which said selector switches for said decimal part of said number are set corresponds to the position to which said coded scale is moved, driving means for said carriage, said electrical effects arresting movement of said movable member, a detector carried by said carriage cooperating with said graduated lines producing an electrical effect when said detector is immediately over a graduated line to stop movement of said movable member.

References Cited in the file of this patent

UNITED STATES PATENTS

| | | |
|---|---|---|
| 2,311,142 | Turrettini | Feb. 16, 1943 |
| 2,537,427 | Seid et al. | Jan. 9, 1951 |
| 2,694,804 | Wagner | Nov. 16, 1954 |